(12) United States Patent
Feng et al.

(10) Patent No.: US 9,489,561 B2
(45) Date of Patent: Nov. 8, 2016

(54) METHOD AND SYSTEM FOR ESTIMATING FINGERPRINT POSE

(71) Applicant: Tsinghua University, Beijing (CN)

(72) Inventors: Jianjiang Feng, Beijing (CN); Jie Zhou, Beijing (CN); Yijing Su, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/415,582

(22) PCT Filed: Jun. 24, 2014

(86) PCT No.: PCT/CN2014/080567
§ 371 (c)(1),
(2) Date: Jan. 17, 2015

(87) PCT Pub. No.: WO2015/131468
PCT Pub. Date: Sep. 11, 2015

(65) Prior Publication Data
US 2015/0347804 A1    Dec. 3, 2015

(30) Foreign Application Priority Data
Mar. 3, 2014  (CN) .......................... 2014 1 0074692

(51) Int. Cl.
*G06K 9/00*       (2006.01)
*G06K 9/62*       (2006.01)
*G06K 9/66*       (2006.01)

(52) U.S. Cl.
CPC ............. *G06K 9/001* (2013.01); *G06K 9/0008* (2013.01); *G06K 9/6212* (2013.01); *G06K 9/66* (2013.01)

(58) Field of Classification Search
CPC ............. G06K 9/001; G06K 9/00885; G06K 9/0008; G06K 9/6212; G06K 9/66
See application file for complete search history.

(56) References Cited

U.S. PATENT DOCUMENTS

| | | | | |
|---|---|---|---|---|
| 7,512,275 | B2* | 3/2009 | Yumoto | G06K 9/00087 382/224 |
| 7,685,432 | B2* | 3/2010 | Mochizuki | G06K 9/00 713/182 |
| 8,588,484 | B2* | 11/2013 | Wang | G06K 9/001 382/115 |
| 2006/0047970 | A1* | 3/2006 | Mochizuki | G06K 9/00 713/186 |
| 2015/0347804 | A1* | 12/2015 | Feng | G06K 9/001 382/124 |

* cited by examiner

*Primary Examiner* — Gregory M Desire
(74) *Attorney, Agent, or Firm* — Kile Park Reed & Houtteman PLLC

(57) ABSTRACT

A method and system for estimating a fingerprint pose are provided. The method includes following steps. A fingerprint image to be estimated is input, features are extracted from the fingerprint image to be estimated in all possible center positions and directions, each feature is scored via a classifier and a center position and direction corresponding to a feature of a highest score is selected as a fingerprint pose estimation result.

12 Claims, 6 Drawing Sheets

METHOD AND SYSTEM FOR ESTIMATING FINGERPRINT POSE

CROSS REFERENCE TO RELATED APPLICATION

This U.S. application claims priority under 35 U.S.C 371 to, and is a U.S. National Phase application of, the International Patent Application No. PCT/CN2014/080567, filed Jun. 24, 2014, which claims the benefit of prior Chinese Application No. 201410074692.4 filed Mar. 3, 2014. The entire contents of the before-mentioned patent applications are incorporated by reference as part of the disclosure of this U.S. application.

FIELD

Embodiments of the present invention generally relate to a fingerprint identification technology field, and more particularly, to a method and system for estimating a fingerprint pose.

BACKGROUND

The fingerprint identification technology has been widely used in various fields, including crime investigation, physical and logical access control, time and attendance. During sampling the fingerprint, fingerprints with a non-standard sampling pose (i.e., the pressing position of the fingerprint is not in the center of the image or the angle of the fingerprint is not vertical) are easy to be generated due to lack of a common pressing standard. In order to identify these fingerprints with non-standard sampling pose, various possible spatial transformations have to be considered in the fingerprint matching algorithm, thus increasing the calculation complexity.

At present, the conventional fingerprint pose estimation methods are based on the feature points of the fingerprint (such as the singular point, the point with a highest curvature on the ridge line). However, these feature points require the fingerprint image should have a high quality and the detection of the feature points is not stable. Especially for the arch pattern, it is more difficult to detect the feature points stably. As a preprocessing step, the error of the fingerprint pose estimation usually results in the failure of the succeeding fingerprint matching algorithm directly. With the fingerprint pose estimation methods having a small error, the spatial transformations in the fingerprint matching algorithm may be effectively reduced, and the efficiency and accuracy of the fingerprint identification may be greatly improved.

SUMMARY

Embodiments of the present invention seek to solve at least one of the problems existing in the related art to at least some extent.

Embodiments of a first broad aspect of the present invention provide a method for estimating a fingerprint pose. The method includes: inputting a fingerprint image to be estimated; extracting features from the fingerprint image to be estimated in all possible center positions and directions; scoring each feature via a classifier; and selecting a center position and direction corresponding to a feature of a highest score as a fingerprint pose estimation result.

With the method for estimating the fingerprint pose according to embodiments of the present invention, the classifier, which may distinguish a fingerprint having a standard pose from a fingerprint having a non-standard pose, is trained from the positive and negative sample images by using an orientation field histogram and a machine learning method. And then all possible poses (i.e., all possible center positions and directions) of the fingerprint image to be estimated are scored, and the center position and direction having the highest score are selected as the fingerprint pose estimation result. With the method according to embodiments of the present invention, the ability to distinguish fingerprints having non-standard pose is improved, an error of the fingerprint pose estimation is significantly reduced, thus improving the accuracy and efficiency of the fingerprint identification when the fingerprint sampling pose is not standard.

In some embodiments, the classifier is established by steps of: performing a standard fingerprint pose calibration for a plurality of training fingerprint images to obtain center positions and directions of the plurality of training fingerprint images respectively; capturing a positive sample image and a negative sample image having a fixed size from each training fingerprint image based on the center position and direction of the each training fingerprint image to obtain a positive sample image set and a negative sample image set; extracting an orientation field histogram feature from each positive sample image and each negative sample image respectively; classifying the positive sample image set into a plurality of groups of positive sample images according to the orientation field histogram features of all the positive sample images; training one classifier for each group of positive sample images according to the orientation field histogram features of the each group of positive sample images and the orientation field histogram features of all the negative sample images.

In some embodiments, extracting an orientation field histogram feature from each positive sample image and each negative sample image respectively includes: dividing the each positive sample image and the each negative sample image into a plurality of image blocks having a same size respectively; extracting an orientation field feature histogram from each image block of the each positive sample image and each image block of the each negative sample image respectively; obtaining the orientation field histogram feature of each positive sample image by combining the orientation field feature histograms of the plurality of image blocks of the each positive sample image; and obtaining the orientation field histogram features of each negative sample image by combining the orientation field feature histogram of the plurality of image blocks of the each negative sample image.

In some embodiments, extracting features from the fingerprint image to be estimated in all possible center positions and directions includes: generating all possible center positions and directions of the fingerprint image to be estimated in a predetermined angle step length and a predetermined position step length; capturing a sample image having a fixed size from the fingerprint image to be estimated based on the center position and direction of the fingerprint image to be estimated and in each possible center position and direction; extracting an orientation field histogram feature from the sample image.

In some embodiments, extracting the orientation field histogram feature from the sample image includes: dividing the sample image into a plurality of image blocks having a same size; extracting an orientation field feature histogram from each image block of the sample image; obtaining the orientation field histogram feature of the sample image by combining the orientation field feature histograms of the plurality of image blocks of the sample image.

In some embodiments, scoring each feature via a classifier includes: scoring the orientation field histogram feature of the sample image via the each classifier.

In some embodiments, selecting a center position and direction corresponding to a feature of a highest score as a fingerprint pose estimation result includes: for the each classifier, selecting the center position and direction corresponding to the orientation field histogram feature of the highest score as the fingerprint pose estimation result respectively.

Embodiments of a second broad aspect of the present invention provide a system for estimating a fingerprint pose. The system includes: an inputting module configured to input a fingerprint image to be estimated; an extracting module configured to extract features from the fingerprint image to be estimated in all possible center positions and directions; a scoring module configured to score each feature via a classifier; and a selecting module configured to select a center position and direction corresponding to a feature of a highest score as a fingerprint pose estimation result.

With the system for estimating the fingerprint pose according to embodiments of the present invention, the classifier, which may distinguish a fingerprint having a standard pose from a fingerprint having a non-standard pose, is trained from the positive and negative sample images by using an orientation field histogram and a machine learning method. And then all possible poses (i.e., all possible center positions and directions) of the fingerprint image to be estimated are scored, and the center position and direction having the highest score are selected as the fingerprint pose estimation result. With the system according to embodiments of the present invention, the ability to distinguish fingerprints having non-standard pose is improved, an error of the fingerprint pose estimation is significantly reduced, thus improving the accuracy and efficiency of the fingerprint identification when the fingerprint sampling pose is not standard.

In some embodiments, the classifier is established via a modeling module, and the modeling module includes: a calibrating unit configured to perform a standard fingerprint pose calibration for a plurality of training fingerprint images to obtain center positions and directions of the plurality of training fingerprint images respectively; a first capturing unit configured to capture a positive sample image and a negative sample image having a fixed size from the each training fingerprint image based on the center position and direction of the each training fingerprint image to obtain a positive sample image set and a negative sample image set; a first extracting unit configured to extract an orientation field histogram feature from each positive sample image and each negative sample image respectively; a classifying unit configured to classify the positive sample image set into a plurality of groups of positive sample images according to the orientation field histogram features of all the positive sample image; a training unit configured to train one classifier for each group of positive sample images according to the orientation field histogram features of the each group of positive sample images and the orientation field histogram features of all the negative sample images.

In some embodiments, the first extracting unit is configured to divide the each positive sample image and the each negative sample image into a plurality of image blocks having a same size respectively; to extract an orientation field feature histogram from each image block of the each positive sample image and each image block of the each negative sample image respectively; to obtain the orientation field histogram feature of each positive sample image by combining the orientation field feature histograms of the plurality of image blocks of the each positive sample image; and to obtain the orientation field histogram features of each negative sample image by combining the orientation field feature histogram of the plurality of image blocks of the each negative sample image.

In some embodiments, the extracting module includes: a generating unit configured to generate all possible center positions and directions of the fingerprint image to be estimated in a predetermined angle step length and a predetermined position step length; a second capturing unit configured to capture a sample image having a fixed size from the fingerprint image to be estimated based on the center position and direction of the fingerprint image to be estimated and in each possible center position and direction; a second extracting unit configured to extract an orientation field histogram feature from the sample image.

In some embodiments, the second extracting unit is configured to divide the sample image into a plurality of image blocks having a same size; to extract an orientation field feature histogram from each image block of the sample image; to obtain the orientation field histogram feature of the sample image by combining the orientation field feature histograms of the plurality of image blocks of the sample image.

In some embodiments, the scoring unit is configured to score the orientation field histogram feature of the sample image via the each classifier.

In some embodiments, the selecting module is configured to, for the each established classifier, select the center position and direction corresponding to the orientation field histogram feature of the highest score as the fingerprint pose estimation result respectively.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
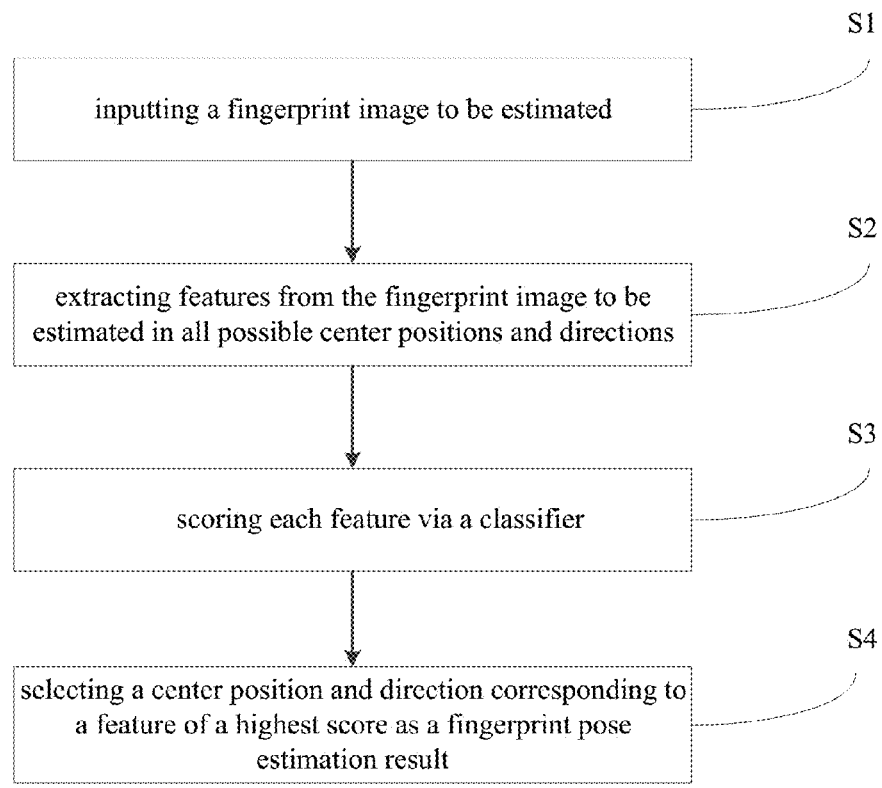
FIG. 1 is a flow chart of a method for estimating a fingerprint pose according to an embodiment of the present invention.

Embodiments of the present invention will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

The conventional fingerprint pose estimation methods either use a fingerprint feature point (such as a center point and a triangulation point) as a standard or trains a feature model just via a fingerprint image having a standard pose. The above two methods both have a certain limitation. The former method is dependent on a stable detection of the feature point, but it is difficult for a current feature point detection method to extract the feature points stably from a fingerprint with a low quality. Although the latter method adopts a fingerprint orientation field to estimate a fingerprint pose, because textures in different positions of the fingerprint have a great similarity, only using the fingerprint image having the standard pose limits a performance of the model for estimating the fingerprint pose, thus increasing an estimation error.

Embodiments of an aspect of the present invention provide a method for estimating a fingerprint pose. It should be noted that the fingerprint may include textures on a finger, a palm, a toe and a sole of human. FIG. 1 is a flow chart of a method for estimating a fingerprint pose according to an embodiment of the present invention. The method will be described with reference to FIG. 1.

At step 1, a fingerprint image to be estimated is inputted.

At step 2, features are extracted from the fingerprint image to be estimated in all possible center positions and directions.

In the embodiment, the step 2 may include following steps.

At step 21, all possible center positions and directions of the fingerprint image to be estimated are generated in a predetermined angle step length $\alpha_d$ and a predetermined position step length $(x_d, y_d)$.

At step 22, a sample image having a fixed size is captured from the fingerprint image to be estimated based on the center position and direction of the fingerprint image to be estimated and in each possible center position and direction.

At step 23, an orientation field histogram feature is extracted from the sample image.

Specifically, a method for extracting the orientation field histogram feature from the sample image is the same with the method for extracting the orientation field histogram feature from the positive sample image (or the negative sample image) described above. The method for extracting the orientation field histogram feature from the sample image includes: the sample image is divided into a plurality of image blocks having a same size, the orientation field feature histogram is extracted from each image block of the sample image, and the orientation field histogram feature of the sample image is obtained by combining the orientation field feature histograms of the plurality of image blocks of the sample image.

At step 3, each feature is scored via a classifier.

The orientation field histogram feature of the sample image is scored via the each classifier. In some embodiments, the classifier is established by following steps. It should be noted that a main purpose of establishing the classifier is to establish a model of a fingerprint having the standard pose, and a process for establishing the classifier is just required to be executed once.

A method for establishing the classifier may include following steps.

At step 01, a standard fingerprint pose calibration is performed for a plurality of training fingerprint images to obtain center positions and directions of the plurality of training fingerprint images respectively.

Figure 2:
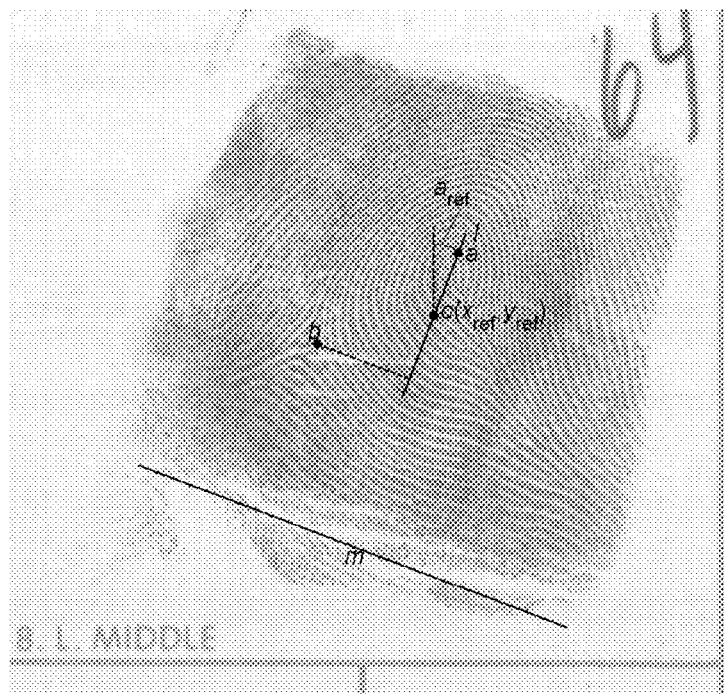
FIG. 2 is a schematic view showing a center position and direction of a fingerprint with a singular point according to an embodiment of the present invention.
Figure 3:
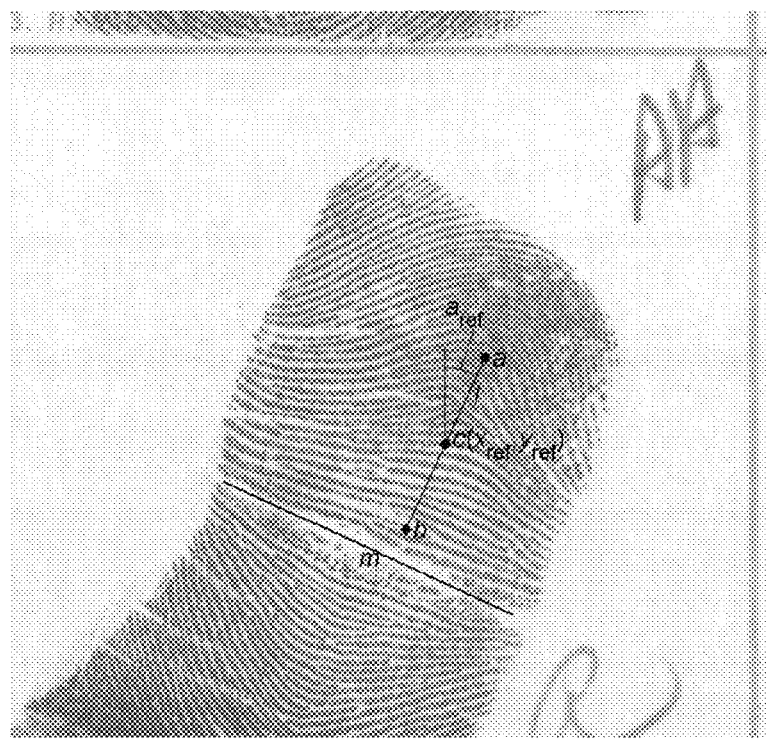
FIG. 3 is a schematic view showing a center position and direction of a fingerprint without a singular point according to an embodiment of the present invention.

Specifically, the fingerprint pose in the fingerprint image can be uniquely determined by a center position and direction of the fingerprint. FIG. 2 is a schematic view showing a center position and direction of a fingerprint with a singular point according to an embodiment of the present invention. FIG. 3 is a schematic view showing a center position and direction of a fingerprint without a singular point according to an embodiment of the present invention. The fingerprint direction is vertical to a fingerprint baseline (such as a line m shown in FIG. 2) and directed to a finger tip. There is no common standard to determine the center position of the fingerprint, especially for an arch pattern without a singular point. In embodiments of the present invention, a center line of the fingerprint is defined as a line (such as a line 1 shown in FIG. 1) that passes through a center point (such as a point a shown in FIG. 2, particularly, when there are two center points, an upper one is selected) and is parallel with the fingerprint direction, and a midpoint (such as a point c shown in FIG. 2) of projections of the center point and a triangular point (such a point b shown in FIG. 2) on the center line is defined as the fingerprint center. For the arch pattern, an intersection point (such as a point b shown in FIG. 3) of the center line and an uppermost horizontal line is taken as a reference point and a midpoint (such as a point c shown in FIG. 3) of a point having a largest curvature (such as a point a shown in FIG. 3) and the reference point is taken as the fingerprint center.

In an embodiment, the standard fingerprint pose calibration is performed for a training fingerprint image I, that is, a center position coordinate $(x_{ref}, y_{ref})$ of the training fingerprint image I and the center line are calibrated according to above definitions and an angle from the center line to a vertical direction is defined as a fingerprint direction $\alpha_{ref}$. In this embodiments, a counter-clockwise direction is defined as positive, in FIG. 2 $x_{ref}$=476, $y_{ref}$=325 and $\alpha_{ref}$=21° and in FIG. 3, $x_{ref}$=511, $y_{ref}$=491 and $\alpha_{ref}$=24°.

At step 02, a positive sample image and a negative sample image having a fixed size are captured from each training fingerprint image based on the center position and direction of the each training fingerprint image to obtain a positive sample image set and a negative sample image set, in which the positive sample image set and the negative sample image set includes all positive sample images and all negative sample images respectively. It should be noted that one positive sample image and a plurality of negative sample images may be captured for each training fingerprint image.

Specifically, the sample images for establishing the classifier are required to have a fixed size, i.e., a width is w pixels and a height is h pixels. The fixed size of the sample image is defined to include most information of the training fingerprint image. In an embodiment, for a 500 dpi fingerprint image, w=640 and h=576. In embodiments of the present invention, a center position of the fingerprint of the positive sample image is just located at a center of the positive sample image and a direction of the fingerprint of the positive sample image is the upward vertical direction. A center position of the fingerprint of the negative sample image should have a position deviation $(x_e, y_e)$ away from a center of the negative sample image and a direction of the fingerprint of the negative sample image should have an angle deviation $\alpha_e$ way from the upward vertical direction. In one embodiment, $|x_e|$, $|y_e|$, $\in(e_1,e_2)$, and $|\alpha_e|\in(e_3,e_4)$. In addition, $e_2$ and $e_4$ are set to ensure the negative image can include certain amount of fingerprint information. Since a size of the fingerprint is limited, an over large position deviation and an over large angle deviation may result in a too small fingerprint region in the negative sample image to invalidate the negative sample image.

Figure 4:
FIG. 4 is a schematic view of a positive sample image according to an embodiment of the present invention.

In an embodiment of the present invention, the training fingerprint image I is rotated to a standard direction (an upward vertical direction) based on the fingerprint direction $\alpha_{ref}$, and then an effective region with a width w and a height h and centered at the center position $(x_{ref}, y_{ref})$ of the training fingerprint image is captured from the rotated training fingerprint image as the positive sample image $I_p$. The positive sample image captured from FIG. 2 is shown in FIG. 4. In this way, the captured positive sample image $I_p$ has a standard center position of the fingerprint (i.e., the center of the training fingerprint image I) and a standard fingerprint direction (i.e., the upward vertical direction).

Figure 5:
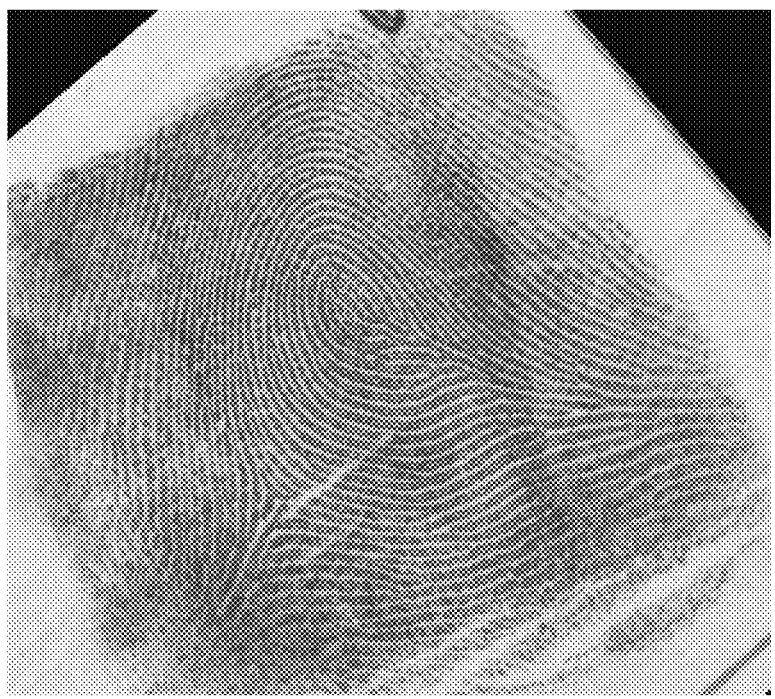
FIG. 5 is a schematic view of a negative sample image according to an embodiment of the present invention.

The position deviation $(x_e, y_e)$ and the angle direction $\alpha_e$ are added to the center position $(x_{ref}, y_{ref})$ of the fingerprint and the fingerprint direction $\alpha_{ref}$ respectively, and then based on an resulted position $(x_{ref}+x_e, y_{ref}+y_e)$ and a direction $\alpha_{ref}+\alpha_e$, an effective region is captured from the training fingerprint image as the negative sample image $I_n$ in a same manner described above. As shown in FIG. 5, in the negative sample image $I_n$, $x_e$=0, $y_e$=0 and $\alpha_e$=20, in which $x_e, y_e$ and $\alpha_e$ may be randomly generated, however, a condition of $|x_e|$, $|y_e|\in(e_1,e_2)$ and $|\alpha_e|\in(e_3,e_4)$ should be satisfied.

At step 03, an orientation field histogram feature is extracted from each positive sample image and each negative sample image respectively.

Figure 6:
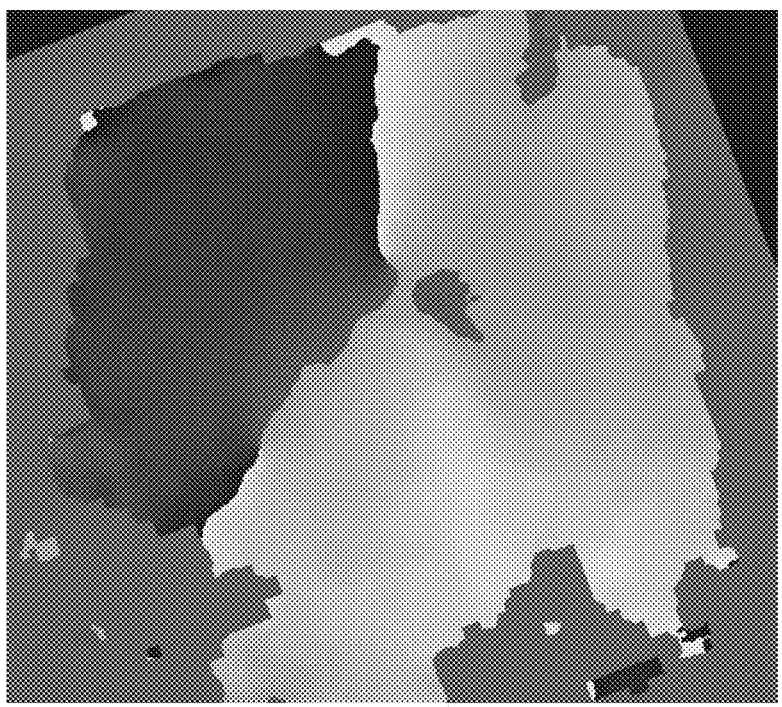
FIG. 6 is a schematic view showing an orientation field feature of the positive sample image shown in FIG. 4 according to an embodiment of the present invention.
Figures 7, 8:
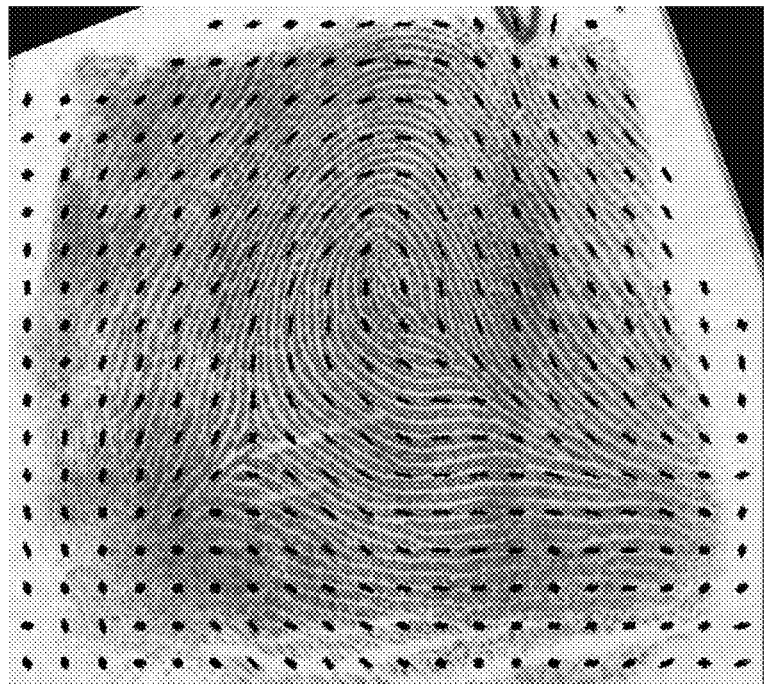
FIG. 7 is a schematic view showing an orientation field histogram feature of the positive sample image shown in FIG. 4 according to an embodiment of the present invention.
FIG. 8 is a schematic view showing a classification analysis result according to an embodiment of the present invention.

Since methods for extracting the orientation field histogram feature from the each positive sample image and from the each negative sample image are the same with each other, only a process of extracting the orientation field histogram feature from the each positive sample image is described as an example in the following. The each positive sample image is divided into a plurality of image blocks having a same size d×d and the quantized fuzzy orientation field feature histogram is extracted from each image block of the each positive sample image, in which the plurality of image blocks may overlap with each other or not. In the embodiment, the plurality of image blocks overlap with each other. Furthermore, a value of each pixel in the orientation field feature histogram is less than 180 and larger than or equal to 0, which indicates a flowing direction of fingerprint ridges around the pixel. During extracting the orientation field feature histogram, the flowing directions of the fingerprint ridges are divided into n groups, and a center direction of each group is treated as a main direction. The each pixel in each image block votes to two adjacent main directions and a voting value is inversely proportional to a distance between the each pixel and the main direction. For example, the flowing directions of the fingerprint ridges are divided into two groups of a 45 degree group and a 135 degree group. In this case, both a 0 degree flowing direction and a 90 degree flowing direction vote 0.5 to the 45 degree group and 0.5 to the 135 degree group respectively, while a 75 degree flowing direction votes ⅔ to the 45 degree group and ⅓ to the 135 degree group. A final number of votes is represented by a length of line segments in FIG. 7. Finally, the orientation field histogram feature of each positive sample image is obtained by combining the orientation field feature histograms of the plurality of image blocks of the each positive sample image, for example, the orientation field feature histograms of the plurality of image blocks of the each positive sample image are jointed sequentially. The orientation field histogram feature of the positive sample image in FIG. 4 is shown in FIG. 6. In an embodiment, in order to extract the orientation field histogram feature from the positive sample image in FIG. 4, assume that d=32, n=16, and the result is shown in FIG. 7. A value of each main direction in the orientation field feature histogram is represented by a length of a black line segment in each image block, and the longer the line segment is, the larger ratio of the corresponding main direction in the each image block is.

At step 04, the positive sample image set is classified into a plurality of groups of positive sample images according to the orientation field histogram features of all the positive sample images.

After the positive sample images and the negative sample images are obtained, the classifier which can distinguish the fingerprint having the standard pose from the fingerprint having non-standard pose can be trained via a discriminant learning method. Since the flowing directions of different fingerprint ridges are significantly different from each other, especially for fingerprint ridges with different fingerprint patterns, the positive sample images are divided into k groups and features of each group of the positive sample images are obtained respectively, in which k may be any positive integer. In an embodiment, a distance between two fingerprint images is a sum of orientation field histogram distances of the plurality of image blocks. The orientation field histogram distance is calculated via a MDPA (Minimum Difference of Pair Assignment) algorithm. Based on a definition of the orientation field histogram distance, the positive sample images are classified via a spectral classification algorithm. FIG. 8 shows an average orientation field histogram feature of the k groups of positive sample images, in which k=5.

At step 05, one classifier is trained for each group of positive sample images according to the orientation field histogram features of the each group of positive sample images and the orientation field histogram features of all the negative sample images.

After the positive sample images of the plurality of training fingerprint images are classified, the one classifier is trained for the each group of positive sample images by using all the negative sample images. For example, a linear classifier can be trained via a SVM (Support Vector Machine) algorithm.

At step 4, a center position and direction corresponding to a feature of a highest score is selected as a fingerprint pose estimation result.

For the each classifier, the center position and direction corresponding to the orientation field histogram feature of the highest score is selected as the fingerprint pose estimation result respectively.

Figure 9:
FIG. 9 is a schematic view showing a fingerprint pose estimation result using a single classifier.
Figure 10:
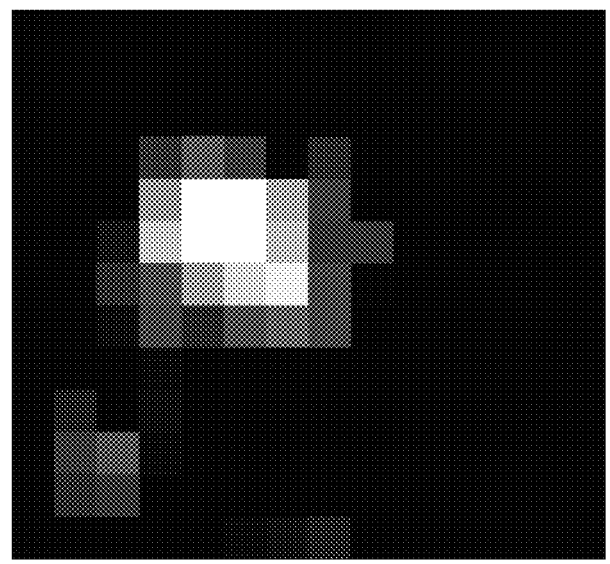
FIG. 10 is a schematic view showing scores output by a classifier according to an embodiment of the present invention.
Figure 11:
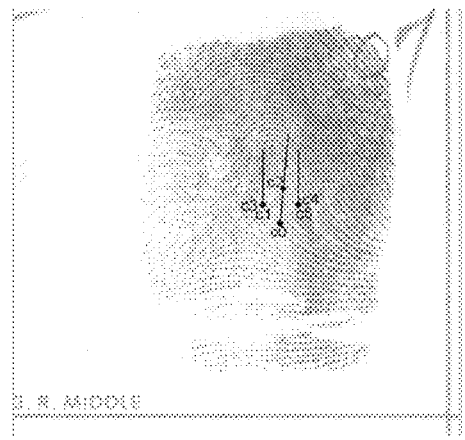
FIG. 11 is a schematic view showing a fingerprint pose estimation result using a plurality of classifiers according to an embodiment of the present invention.

FIG. 9 is a schematic view showing the fingerprint pose estimation result, in which $\alpha_d=5°$, $x_d=y_d=64$, and the positive sample images are not classified to train a plurality of classifiers. In addition, as shown in FIG. 9, a circle dot represents the fingerprint center, and a line segment represents the fingerprint direction. In this example, the center position of the fingerprint is at (x=328, y=274) and the fingerprint direction is $\alpha=15°$. FIG. 10 is a schematic view showing scores obtained by one classifier at each candidate center position of the fingerprint image. FIG. 11 is a schematic view showing two fingerprint pose estimation results obtained from two different fingerprint images of a same fingerprint via a single classifier (c0) and five classifiers (c1-c5) respectively, in which the five classifiers (c1-c5) are obtained by training.

It can be known that, the number k of the groups of positive sample images may be any positive integer. When k=1, the positive sample images are not classified. Since the sample images used for training the each classifier are different and a number of the sample images is limited, models for establishing classifiers are different from each other, and thus the fingerprint pose estimation results are usually not the same. Therefore, according to different requirements of different application scenes, one or more fingerprint pose estimation results can be selected as a standard or to be further treated. With an increase of k, an accuracy of the fingerprint pose estimation is improved. However, an estimation time is increased and more training fingerprint images are required to train the plurality of classifiers.

With the method for estimating the fingerprint pose according to embodiments of the present invention, the classifier, which may distinguish a fingerprint having a standard pose from a fingerprint having a non-standard pose, is trained from the positive and negative sample images by using an orientation field histogram and a machine learning method. And then all possible poses (i.e., all possible center positions and directions) of the fingerprint image to be estimated are scored, and the center position and direction having the highest score are selected as the fingerprint pose estimation result. With the method according to embodiments of the present invention, the ability to distinguish fingerprints having non-standard pose is improved, an error of the fingerprint pose estimation is significantly reduced, thus improving the accuracy and efficiency of the fingerprint identification when the fingerprint sampling pose is not standard. In addition, since the method according to embodiments of the present invention makes use of features of the whole fingerprint image, a quality of the partial fingerprint has little effect on the estimation results. Moreover, the method which studies distribution regularities of the features from the plurality of training samples to estimate the fingerprint pose has a high universality.

Figure 12:
FIG. 12 is a block diagram of a system for estimating a fingerprint pose according to an embodiment of the present invention.

Embodiments of another aspect of the present invention provide a system for estimating a fingerprint pose. As shown in FIG. 12, the system includes: an inputting module 20, an extracting module 30, a scoring module 40 and a selecting module 50.

Specifically, the inputting module 20 is configured to input a fingerprint image to be estimated. The extracting module 30 is configured to extract features from the fingerprint image to be estimated in all possible center positions and directions. The scoring module 40 is configured to score each feature via a classifier. The selecting module 50 is configured to select a center position and direction corresponding to a feature of a highest score as a fingerprint pose estimation result.

Figure 13:
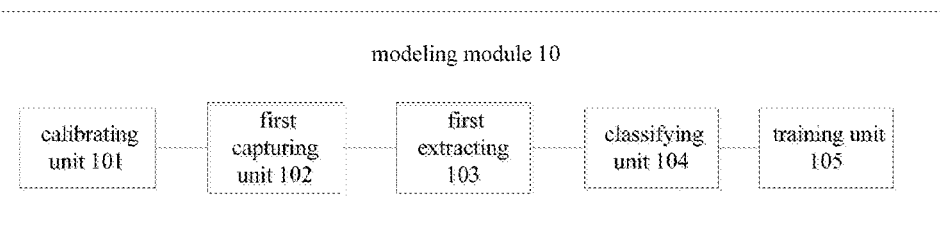
FIG. 13 is a block diagram of a modeling module according to an embodiment of the present invention.

In some embodiments, the classifier is established via a modeling module 10. As shown in FIG. 13, the modeling module 10 includes: a calibrating unit 101, a first capturing unit 102, a first extracting unit 103, a classifying unit 104 and a training unit 105.

Specifically, the calibrating unit 101 is configured to perform a standard fingerprint pose calibration for a plurality of training fingerprint images to obtain center positions and directions of the plurality of training fingerprint images respectively.

Specifically, the fingerprint pose in the fingerprint image can be uniquely determined by a center position and direction of the fingerprint. The fingerprint direction is vertical to a fingerprint baseline (such as a line m shown in FIG. 2) and directed to a finger tip. There is no common standard to determine the center position of the fingerprint, especially for an arch pattern without a singular point. In embodiments of the present invention, a center line of the fingerprint is defined as a line (such as a line 1 shown in FIG. 1) that passes through a center point (such as a point a shown in FIG. 2, particularly, when there are two center points, an upper one is selected) and is parallel with the fingerprint direction, and a midpoint (such as a point c shown in FIG. 2) of projections of the center point and a triangular point (such a point b shown in FIG. 2) on the center line is defined as the fingerprint center. For the arch pattern, an intersection point (such as a point b shown in FIG. 3) of the center line and an uppermost horizontal line is taken as a reference point and a midpoint (such as a point c shown in FIG. 3) of a point having a largest curvature (such as a point a shown in FIG. 3) and the reference point is taken as the fingerprint center.

In an embodiment, the standard fingerprint pose calibration is performed for a training fingerprint image I, that is, a center position coordinate $(x_{ref}, y_{ref})$ of the training fingerprint image I and the center line are calibrated according to above definitions and an angle from the center line to a vertical direction is defined as a fingerprint direction $\alpha_{ref}$. In this embodiments, a counter-clockwise direction is defined as positive, in FIG. 2 $x_{ref}=476$, $y_{ref}=325$ and $\alpha_{ref}=21°$ and in FIG. 3, $x_{ref}=511$, $y_{ref}=491$ and $\alpha_{ref}=24°$.

The first capturing unit 102 is configured to capture a positive sample image and a negative sample image having a fixed size from the each training fingerprint image based on the center position and direction of the each training fingerprint image to obtain a positive sample image set and a negative sample image set.

Specifically, the sample images for establishing the classifier are required to have a fixed size, i.e., a width is w pixels and a height is h pixels. The fixed size of the sample image is defined to include most information of the training fingerprint image. In an embodiment, for a 500 dpi fingerprint image, w=640 and h=576. In embodiments of the present invention, a center position of the fingerprint of the positive sample image is just located at a center of the positive sample image and a direction of the fingerprint of the positive sample image is the upward vertical direction. A center position of the fingerprint of the negative sample image should have a position deviation $(x_e, y_e)$ away from a center of the negative sample image and a direction of the fingerprint of the negative sample image should an angle deviation $\alpha_e$ away from the upward vertical direction. In one embodiment, $|x_e|$, $|y_e| \in (e_1, e_2)$, and $|\alpha_e| \in (e_3, e_4)$. In addition, $e_2$ and $e_4$ are set to ensure the negative image can include certain amount of fingerprint information. Since a size of the fingerprint is limited, an over large position deviation and an over large angle deviation may result in a too small fingerprint region in the negative sample image to invalidate the negative sample image.

In an embodiment of the present invention, the training fingerprint image I is rotated to a standard direction (an upward vertical direction) based on the fingerprint direction $\alpha_{ref}$, and then an effective region with a width w and a height h and centered at the center position $(x_{ref}, y_{ref})$ of the training fingerprint image is captured from the rotated training fingerprint image as the positive sample image $I_p$. The positive sample image captured from FIG. 2 is shown in FIG. 4. In this way, the e captured positive sample image $I_p$ has a standard center position of the fingerprint (i.e., the center of the training fingerprint image I) and a standard fingerprint direction (i.e., the upward vertical direction).

The position deviation $(x_e, y_e)$ and the angle direction $\alpha_e$ are added to the center position $(x_{ref}, y_{ref})$ of the fingerprint and the fingerprint direction $\alpha_{ref}$ respectively, and then based on an resulted position $(x_{ref}+x_e, y_{ref}+y_e)$ and a direction $\alpha_{ref}+\alpha_e$, an effective region is captured from the training fingerprint image as the negative sample image $I_n$ in a same manner described above. As shown in FIG. 5, in the negative sample image $I_n$, $x_e=0$, $y_e=0$ and $\alpha_e=20$, in which $x_e$, $y_e$ and $\alpha_e$ may be randomly generated, however, a condition of $|x_e|$, $|y_e| \in (e_1, e_2)$ and $|\alpha_e| \in (e_3, e_4)$ should be satisfied.

The first extracting unit 103 is configured to extract an orientation field histogram feature from each positive sample image and each negative sample image respectively.

Specifically, the first extracting unit 103 is configured to divide the each positive sample image and the each negative sample image into a plurality of image blocks having a same size respectively; to extract an orientation field feature histogram from each image block of the each positive sample image and each image block of the each negative sample image respectively; to obtain the orientation field histogram feature of each positive sample image by combining the orientation field feature histograms of the plurality of image blocks of the each positive sample image; and to obtain the orientation field histogram features of each negative sample image by combining the orientation field feature histogram of the plurality of image blocks of the each negative sample image.

In one embodiment, a value of each pixel in the orientation field feature histogram is less than 180 and larger than or equal to 0, which indicates a flowing direction of fingerprint ridges around the pixel. During extracting the orientation field feature histogram, the flowing directions of the fingerprint ridges are divided into n groups, and a center direction of each group is treated as a main direction. The each pixel in each image block votes to two adjacent main directions and a voting value is inversely proportional to a distance between the each pixel and the main direction. For example, the flowing directions of the fingerprint ridges are divided into two groups of a 45 degree group and a 135 degree group. In this case, both a 0 degree flowing direction and a 90 degree flowing direction vote 0.5 to the 45 degree group and 0.5 to the 135 degree group respectively, while a 75 degree flowing direction votes ⅔ to the 45 degree group and ⅓ to the 135 degree group. A final number of votes is represented by a length of line segments in FIG. 7. Finally, the orientation field histogram feature of each positive sample image is obtained by combining the orientation field feature histograms of the plurality of image blocks of the each positive sample image, for example, the orientation field feature histograms of the plurality of image blocks of the each positive sample image are jointed sequentially. The orientation field histogram feature of the positive sample image in FIG. 4 is shown in FIG. 6. In an embodiment, in order to extract the orientation field histogram feature from the positive sample image in FIG. 4, assume that d=32, n=16, and the result is shown in FIG. 7. A value of each main direction in the orientation field feature histogram is represented by a length of a black line segment in each image block, and the longer the line segment is, the larger ratio of the corresponding main direction in the each image block is.

The classifying unit 104 is configured to classify the positive sample image set into a plurality of groups of positive sample images according to the orientation field histogram features of all the positive sample image.

After the positive sample images and the negative sample images are obtained, the classifier which can distinguish the fingerprint having the standard pose from the fingerprint having non-standard pose can be trained via a discriminant learning method. Since the flowing directions of different fingerprint ridges are significantly different from each other, especially for fingerprint ridges with different fingerprint patterns, the positive sample images are divided into k groups and features of each group of the positive sample images are obtained respectively, in which k may be any positive integer. In an embodiment, a distance between two fingerprint images is a sum of orientation field histogram distances of the plurality of image blocks. The orientation field histogram distance is calculated via a MDPA (Minimum Difference of Pair Assignment) algorithm. Based on a definition of the orientation field histogram distance, the positive sample images are classified via a spectral classification algorithm. FIG. 8 shows an average orientation field histogram feature of the k groups of positive sample images, in which k=5.

The training unit 105 is configured to train one classifier for each group of positive sample images according to the orientation field histogram features of the each group of positive sample images and the orientation field histogram features of all the negative sample images.

After the positive sample images of the plurality of training fingerprint images are classified, the training unit 15 is configured to train the one classifier for the each group of positive sample images by using all the negative sample images. In an embodiment of the present invention, a linear classifier can be trained via a SVM algorithm.

Figure 14:
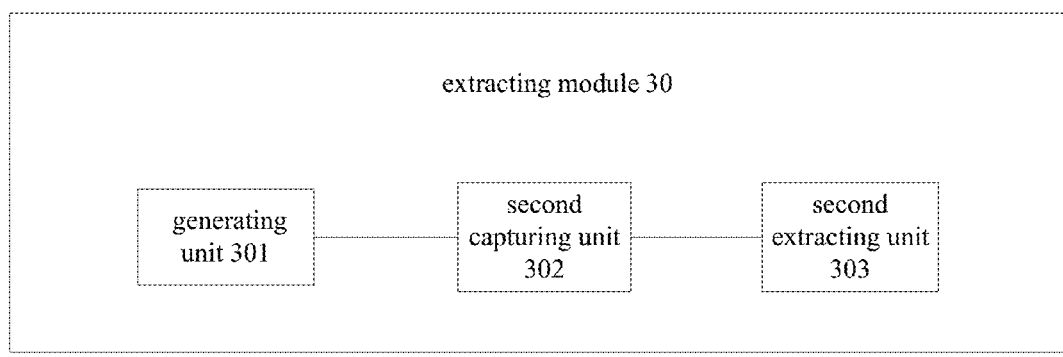
FIG. 14 is a block diagram of an extracting module according to an embodiment of the present invention.

As shown in FIG. 14, in an embodiment of the present invention, the extracting module 30 includes: a generating unit 301, a second capturing unit 302 and a second extracting unit 303.

The generating unit 301 is configured to generate all possible center positions and directions of the fingerprint image to be estimated in a predetermined angle step length $\alpha_d$ and a predetermined position step length $(x_d, y_d)$. The second capturing unit 302 is configured to capture a sample image having a fixed size from the fingerprint image to be estimated based on the center position and direction of the fingerprint image to be estimated and in each possible center position and direction. The second extracting unit 303 is configured to extract an orientation field histogram feature from the sample image.

In one embodiment, the second extracting unit 303 is configured to divide the sample image into a plurality of image blocks having a same size, to extract an orientation field feature histogram from each image block of the sample image and to obtain the orientation field histogram feature of the sample image by combining the orientation field feature histograms of the plurality of image blocks of the sample image.

Furthermore, the scoring module 40 is configured to score the orientation field histogram feature of the sample image via the each classifier trained by the modeling module 10. And the selecting module 50 is configured to, for the each classifier, select the center position and direction corresponding to the orientation field histogram feature of the highest score as the fingerprint pose estimation result respectively.

With the system for estimating the fingerprint pose according to embodiments of the present invention, the classifier, which may distinguish a fingerprint having a standard pose from a fingerprint having a non-standard pose, is trained from the positive and negative sample images by using an orientation field histogram and a machine learning method. And then t all possible poses (i.e., all possible center positions and directions) of the fingerprint image to be estimated are scored, and the center position and direction having the highest score are selected as the fingerprint pose estimation result. With the system according to embodiments of the present invention, the ability to distinguish fingerprints having non-standard pose is improved, an error of the fingerprint pose estimation is significantly reduced, thus improving the accuracy and efficiency of the fingerprint identification when the fingerprint sampling pose is not standard.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A method for estimating a fingerprint pose, comprising:
    inputting a fingerprint image to be estimated;
    extracting features from the fingerprint image to be estimated in all possible center positions and directions;
    scoring each feature via a classifier; and
    selecting a center position and direction corresponding to a feature of a highest score as a fingerprint pose estimation result;
    wherein the classifier is established by steps of:
    performing a standard fingerprint pose calibration for a plurality of training fingerprint images to obtain center positions and directions of the plurality of training fingerprint images respectively;
    capturing a positive sample image and a negative sample image having a fixed size from each training fingerprint image based on the center position and direction of the each training fingerprint image to obtain a positive sample image set and a negative sample image set;
    extracting an orientation field histogram feature from each positive sample image and each negative sample image respectively;
    classifying the positive sample image set into a plurality of groups of positive sample images according to the orientation field histogram features of all the positive sample images;
    training one classifier for each group of positive sample images according to the orientation field histogram features of the each group of positive sample images and the orientation field histogram features of all the negative sample images.

2. The method according to claim 1, wherein extracting an orientation field histogram feature from each positive sample image and each negative sample image respectively comprises:
    dividing the each positive sample image and the each negative sample image into a plurality of image blocks having a same size respectively;
    extracting an orientation field feature histogram from each image block of the each positive sample image and each image block of the each negative sample image respectively;
    obtaining the orientation field histogram feature of each positive sample image by combining the orientation field feature histograms of the plurality of image blocks of the each positive sample image; and obtaining the orientation field histogram features of each negative sample image by combining the orientation field feature histogram of the plurality of image blocks of the each negative sample image.

3. The method according to claim 1, wherein extracting features from the fingerprint image to be estimated in all possible center positions and directions comprises:
    generating all possible center positions and directions of the fingerprint image to be estimated in a predetermined angle step length and a predetermined position step length;
    capturing a sample image having a fixed size from the fingerprint image to be estimated based on the center position and direction of the fingerprint image to be estimated and in each possible center position and direction;
    extracting an orientation field histogram feature from the sample image.

4. The method according to claim 3, wherein extracting the orientation field histogram feature from the sample image comprises:
    dividing the sample image into a plurality of image blocks having a same size;
    extracting an orientation field feature histogram from each image block of the sample image;

obtaining the orientation field histogram feature of the sample image by combining the orientation field feature histograms of the plurality of image blocks of the sample image.

5. The method according to claim 3, wherein scoring each feature via a classifier comprises:
scoring the orientation field histogram feature of the sample image via the each classifier.

6. The method according to claim 5, wherein selecting a center position and direction corresponding to a feature of a highest score as a fingerprint pose estimation result includes: for the each classifier, selecting the center position and direction corresponding to the orientation field histogram feature of the highest score as the fingerprint pose estimation result respectively.

7. A system for estimating a fingerprint pose, comprising:
an inputting module configured to input a fingerprint image to be estimated;
an extracting module configured to extract features from the fingerprint image to be estimated in all possible center positions and directions;
a scoring module configured to score each feature via a classifier;
a selecting module configured to select a center position and direction corresponding to a feature of a highest score as a fingerprint pose estimation result;
a non-transitory computer-readable medium comprising computer-executable instructions stored thereon; and
an instruction execution system, which is configured by the instructions to implement at least one of above modules or units;
wherein the classifier is established via a modeling module, and the modeling module comprises:
a calibrating unit configured to perform a standard fingerprint pose calibration for a plurality of training fingerprint images to obtain center positions and directions of the plurality of training fingerprint images respectively;
a first capturing unit configured to capture a positive sample image and a negative sample image having a fixed size from the each training fingerprint image based on the center position and direction of the each training fingerprint image to obtain a positive sample image set and a negative sample image set;
a first extracting unit configured to extract an orientation field histogram feature from each positive sample image and each negative sample image respectively;
a classifying unit configured to classify the positive sample image set into a plurality of groups of positive sample images according to the orientation field histogram features of all the positive sample image;
a training unit configured to train one classifier for each group of positive sample images according to the orientation field histogram features of the each group of positive sample images and the orientation field histogram features of all the negative sample images.

8. The system according to claim 7, wherein the first extracting unit is configured
to divide the each positive sample image and the each negative sample image into a plurality of image blocks having a same size respectively;
to extract an orientation field feature histogram from each image block of the each positive sample image and each image block of the each negative sample image respectively;
to obtain the orientation field histogram feature of each positive sample image by combining the orientation field feature histograms of the plurality of image blocks of the each positive sample image; and
to obtain the orientation field histogram features of each negative sample image by combining the orientation field feature histogram of the plurality of image blocks of the each negative sample image.

9. The system according to claim 7, wherein the extracting module comprises:
a generating unit configured to generate all possible center positions and directions of the fingerprint image to be estimated in a predetermined angle step length and a predetermined position step length;
a second capturing unit configured to capture a sample image having a fixed size from the fingerprint image to be estimated based on the center position and direction of the fingerprint image to be estimated and in each possible center position and direction;
a second extracting unit configured to extract an orientation field histogram feature from the sample image.

10. The system according to claim 9, wherein the second extracting unit is configured
to divide the sample image into a plurality of image blocks having a same size;
to extract an orientation field feature histogram from each image block of the sample image;
to obtain the orientation field histogram feature of the sample image by combining the orientation field feature histograms of the plurality of image blocks of the sample image.

11. The system according to claim 9, wherein the scoring module is configured to score the orientation field histogram feature of the sample image via the each classifier.

12. The system according to claim 11, wherein the selecting module is configured to, for the each classifier, select the center position and direction corresponding to the orientation field histogram feature of the highest score as the fingerprint pose estimation result respectively.

* * * * *